United States Patent
Uehara

(10) Patent No.: US 11,046,028 B2
(45) Date of Patent: Jun. 29, 2021

(54) METHOD FOR MOLDING COMPOSITE MATERIAL

(71) Applicant: Nissan Motor Co., Ltd., Yokohama (JP)

(72) Inventor: Shigetaka Uehara, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/616,540

(22) PCT Filed: Jun. 9, 2017

(86) PCT No.: PCT/JP2017/021549
§ 371 (c)(1),
(2) Date: Nov. 25, 2019

(87) PCT Pub. No.: WO2018/225271
PCT Pub. Date: Dec. 13, 2018

(65) Prior Publication Data
US 2020/0376782 A1    Dec. 3, 2020

(51) Int. Cl.
*B29C 70/48* (2006.01)

(52) U.S. Cl.
CPC .................................... *B29C 70/48* (2013.01)

(58) Field of Classification Search
CPC ... B29C 70/48; B29C 33/10; B29C 45/14778; B29C 45/14786
See application file for complete search history.

(56) References Cited

U.S. PATENT DOCUMENTS

| 2,847,712 | A | * | 8/1958 | Pollard | ............. | B29C 45/14786 |
| | | | | | | 264/259 |
| 5,804,292 | A | | 9/1998 | Ishitoya | | |
| 6,257,858 | B1 | * | 7/2001 | Pabsch | .................. | B29C 70/443 |
| | | | | | | 264/571 |
| 9,950,479 | B2 | | 4/2018 | Yamamoto et al. | | |
| 2018/0029317 | A1 | * | 2/2018 | Tsotsis | .................... | B29C 70/36 |

FOREIGN PATENT DOCUMENTS

| CN | 1631659 A | 6/2005 |
| CN | 101531038 A | 9/2009 |
| CN | 203637197 U | 6/2014 |

(Continued)

OTHER PUBLICATIONS

Ravey, C., E. Ruix, F. Trochu, Determination of the optimal impregnation velocity in Resin Transfer Molding by capillary rise experiments and infrared thermography, Composites Science and Technology, vol. 99 (2014), pp. 96-102. (Year: 2014).*

(Continued)

*Primary Examiner* — Matthew J Daniels
(74) *Attorney, Agent, or Firm* — Global IP Counselors, LLP

(57) ABSTRACT

A molding method is performed for molding a composite material in which resin is injected in a state in which a fiber base material is disposed in a cavity formed in a metal mold and the resin is cured to form the composite material. The molding method includes enhancing wettability of a portion of the fiber base material, and disposing the portion of the fiber base material in a narrow portion in which a gap constituting the cavity is smaller than other locations.

8 Claims, 7 Drawing Sheets

(56) References Cited

FOREIGN PATENT DOCUMENTS

| CN | 106273548 A | 1/2017 |
|---|---|---|
| JP | 11-58536 A | 3/1999 |
| JP | 2010-221642 A | 10/2010 |
| JP | 2011-143645 A | 7/2011 |
| JP | 4774839 B2 | 9/2011 |
| JP | 2016-56491 A | 4/2016 |
| WO | 2012/115067 A1 | 8/2012 |
| WO | 2017/042921 A1 | 3/2017 |

OTHER PUBLICATIONS

B. Caglar, D. Salvatori, E.M. Sozer, V. Michaud, In-plane permeability distribution mapping of isotropic mats using flow front detection, Composites Part A, vol. 113 (2018), pp. 275-286. (Year: 2018).*

Patel, N. and L.J. Lee, Modeling of Void Formation and Removal in Liquid Composite Molding, Part I: Wettability Analysis, Polymer Composites, vol. 17, No. 1 (Feb. 1996), pp. 96-103. (Year: 1996).*

Ikuta, N., T. Morii, S. Ohori, M. Yasueda, Improvement of Resin Impregnation Into Glass Cloth By Silane Treatment in Resin Transfer Molding, Composite Interfaces, vol. 12, No. 7 (2005), 6 pages. (Year: 2005).*

J.S. Leclerc, E. Ruiz, Porosity reduction using optimized flow velocity in Resin Transfer Molding, Composites: Part A, vol. 39 (2008), pp. 1859-1868. (Year: 2008).*

* cited by examiner

METHOD FOR MOLDING COMPOSITE MATERIAL

CROSS-REFERENCE TO RELATED APPLICATIONS

This application is a U.S. national stage application of International Application No. PCT/JP2017/021549, filed on Jun. 9, 2017.

BACKGROUND

Technical Field

The present invention relates to a molding method for a molding composite material. Background Information RTM (Resin Transfer Molding) molding method and CRTM (Compression Resin Transfer Molding) molding method are known from the prior art as molding methods for composite materials in which a fiber base material is impregnated with a resin.

In these molding methods, the fiber base material is placed in a cavity in a metal mold into which resin is injected, but the fiber base material restricts the flow. Attempts have thus been made to suppress the flow resistance; for example, Japanese Laid-Open Patent Application No. 2010-221642 (Patent Document 1) discloses the formation of a cavity between horizontal surfaces that is larger than the thickness of the article to be molded.

SUMMARY

However, besides the simple horizontal surfaces disclosed in the aforementioned prior art, in practice, the molding surfaces of a metal mold may take on complex shapes that correspond to the shapes of vehicle bodies, etc.

For this reason, even if the metal mold is controlled, for example, so that a gap of a prescribed interval is formed between the horizontal molding surfaces, there may be other locations where the gap is narrow, between inclined molding surfaces, for example. Since the flow resistance is high in such locations and the resin does not flow as easily compared with other locations, there is the risk that variations in the impregnation of the resin will occur. Variations in resin impregnation may cause a reduction in strength and rigidity, and may result in poor appearance, which is not preferable.

Therefore, the object of the present invention is to provide a molding method for composite materials that can suppress variations in resin impregnation.

In the molding method for molding a composite material according to the present invention which realizes the aforementioned object, a composite material is formed by disposing a fiber base material within a cavity formed inside a metal mold, injecting resin, and curing the resin. In the molding method for a composite material according to the present invention, the wettability of part of the fiber base material is enhanced, and one part of the fiber base material is disposed in a narrow portion where the gap constituting the cavity is smaller than other locations.

By means of the molding method for composite materials of the present invention, it is possible to suppress variations in resin impregnation.

DETAILED DESCRIPTION OF THE EMBODIMENTS

Embodiments of the present invention will be explained below with reference to the appended drawings. The dimensional ratios of the drawings are exaggerated for the sake of explanatory clarity and may differ from actual ratios.

First Embodiment

Figure 1:
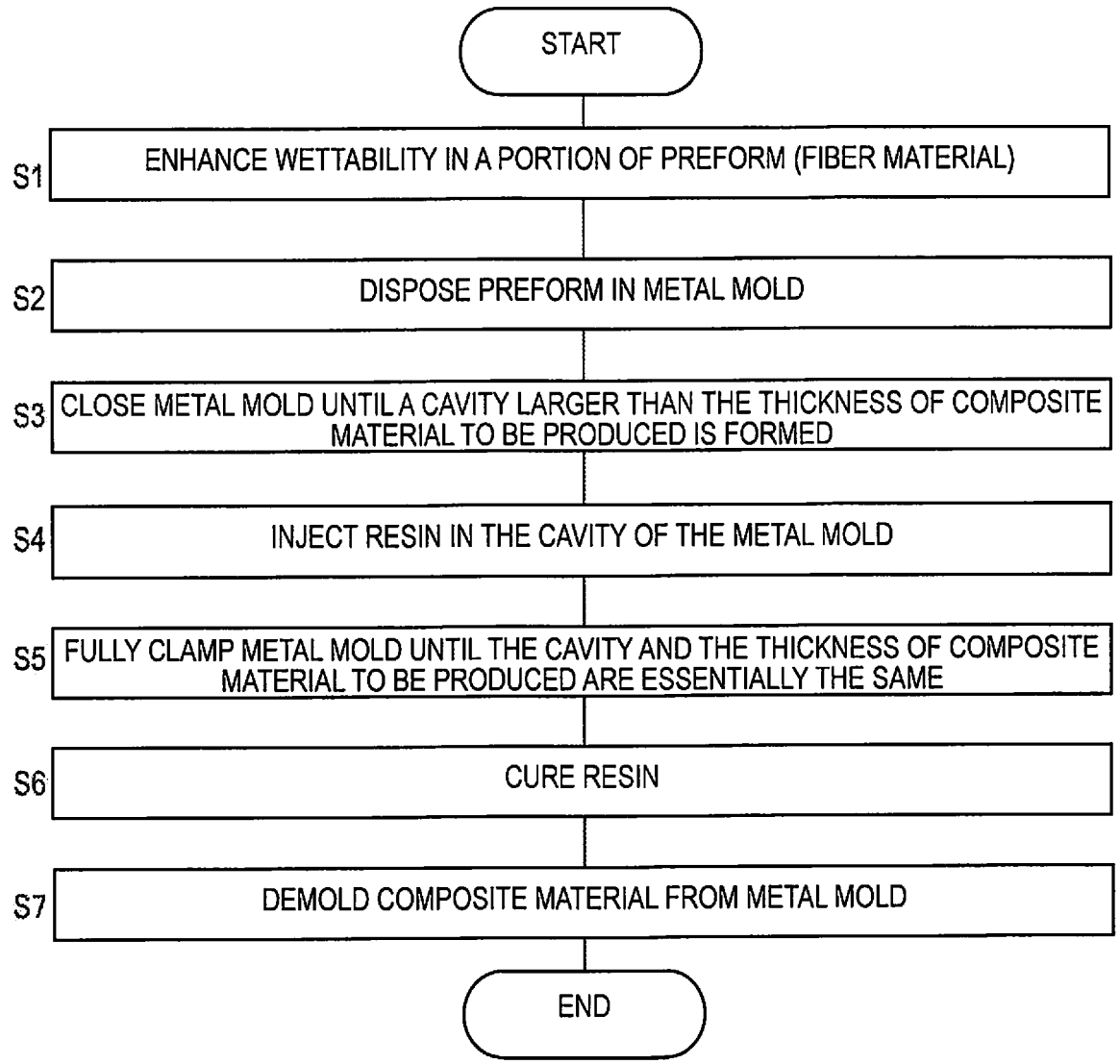
FIG. 1 is a flow chart illustrating a general overview of the molding method according to an embodiment.

As shown in FIG. 1, in the molding method for molding a composite material according to the present embodiment, wettability is enhanced in a portion of a preform (fiber base material) (Step S1), and the preform is disposed in a metal mold (Step S2). Thereafter, the metal mold is closed (Step S3) and resin is injected into the metal mold (Step S4). After the resin injection, the metal mold is further clamped (Step S5). Thereafter, the resin is cured (Step S6) and the composite material is demolded (Step S7). Each step will be described below.

Figure 2:
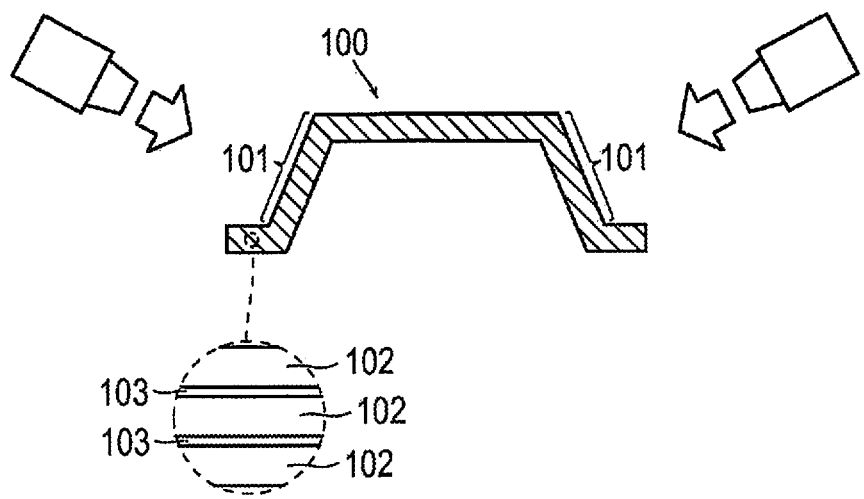
FIG. 2 is a view schematically illustrating the process for enhancing wettability in a part of the fiber base material.

As shown in FIG. 2, in Step SI, an enhanced wettability portion 101 in which the wettability is enhanced is formed at an inclined portion of a preform 100 by means of irradiating a plasma or ultraviolet light thereon. Examples of factors that improve wettability include the addition of a hydrophilic functional group and substrate roughening.

The preform 100 has a configuration in which a plurality of fiber base materials 102 are stacked via an adhesive 103, but is not limited in this way, and the preform may be composed of only one fiber base material 102. The preform 100 is shaped in advance by means of preforming and is essentially trapezoidal in shape in the present embodiment. The enhanced wettability portion 101 is the portion that forms the legs of the trapezoidal shape.

In the present embodiment, wettability is partially enhanced in the state of the preform 100 obtained by shaping the fiber base material 102, but the present invention is not limited in this way, and the wettability may be partially enhanced prior to the preforming. For example, before the fiber base material 102, which is essentially flat prior to shaping by means of preforming, is cut to a prescribed size or after being cut, the wettability may be partially enhanced at a prescribed location of the essentially flat fiber base material 102.

The fiber base material 102 can be formed from, for example, carbon fiber, glass fiber, aramid fiber, polyamide (PA) fiber, polypropylene (PP) fiber, and acrylic fiber. The fiber base material 102 may have the structure, for example, of a woven fabric in which the fibers are combined vertically and horizontally.

The adhesive 103 is not particularly limited as long as the fiber base materials 102 can be bonded together; examples include thermoplastic resins, such as polyolefin resin, styrene resin, nylon resin and polyurethane resin, and thermosetting resins, such as epoxy resin, phenol resin and unsaturated polyester resin.

Figure 3:
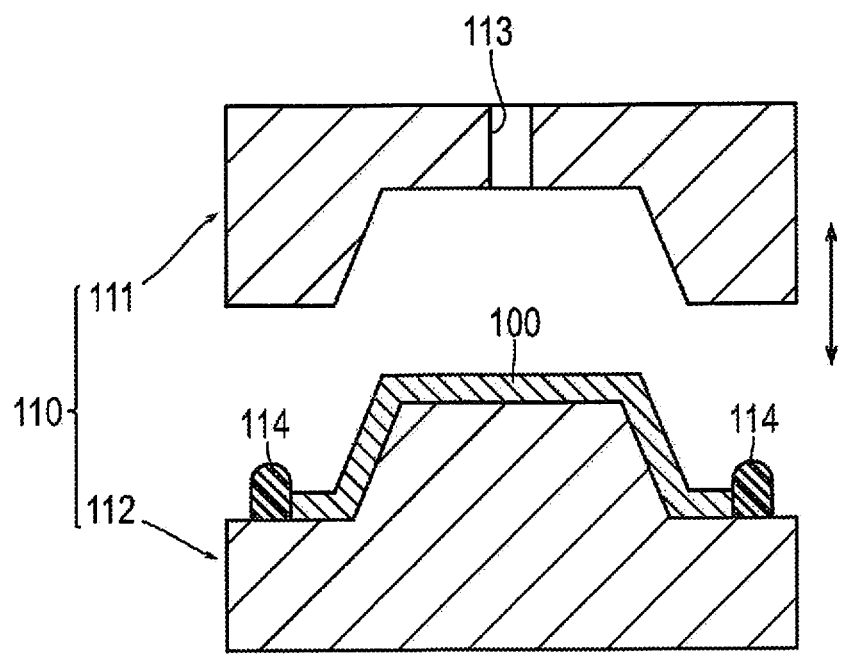
FIG. 3 is a view schematically illustrating the arrangement of the fiber base material in a metal mold.

As shown in FIG. 3, in Step S2, the preform 100 is disposed in an opened metal mold 110. The metal mold 110 includes a movable die 111 and a fixed die 112. The preform 100 is pre-shaped so as to conform to the shape of the molding surface of the movable die 111 and the fixed die 112, and is disposed along the molding surface of the fixed die 112 in Step S2.

The movable die 111 is connected to an unillustrated drive device equipped with a hydraulic cylinder, for example, and can freely move close to and away from the fixed die 112. The movable die 111 is formed with a resin injection port 113.

The fixed die 112 has a convex molding surface that opposes the concave molding surface of the movable die 111. Alternatively, the movable die 111 may be provided with a convex molding surface, and the fixed die 112 with a concave molding surface. A sealing member 114 such as a gasket is provided on the outer perimeter of the fixed die 112. The sealing member 114 may be provided on the outer perimeter of the movable die 111 instead of on the fixed die 112.

Figure 4:
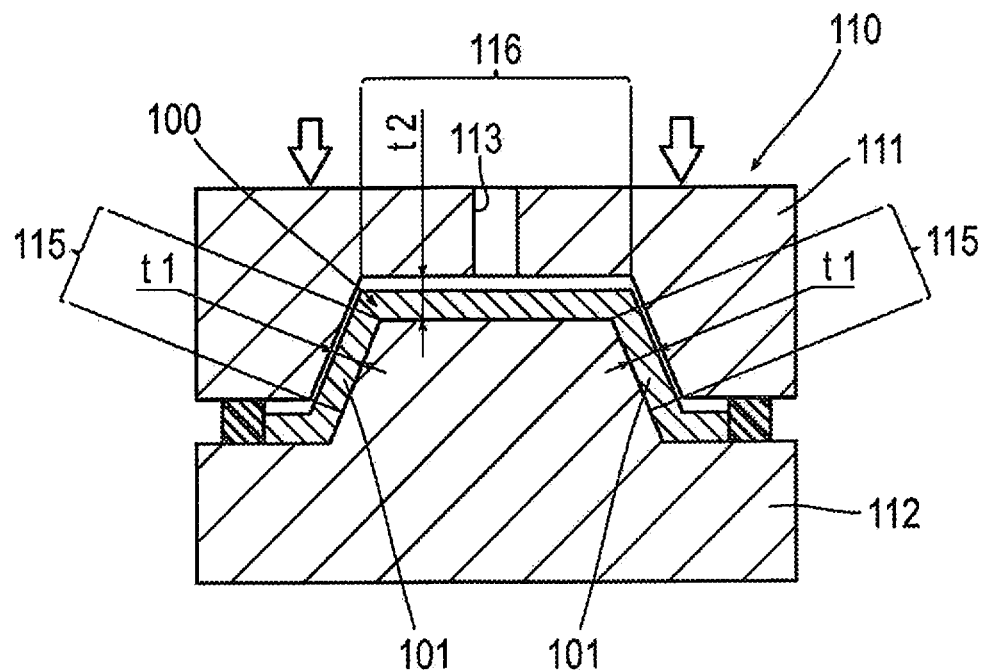
FIG. 4 is a view schematically illustrating a state in which the fiber base material is disposed and the metal mold is closed.

As shown in FIG. 4, in Step S3, the movable die 111 is moved to approach the fixed die 112, and the preform 100 is disposed inside the closed metal mold 110. At this time, the cavity that is formed between the movable die 111 and the fixed die 112 is greater than the thickness of the composite material to be ultimately produced.

In addition, of the gaps that form the cavity, a gap t1 between the inclined molding surfaces is smaller than a gap t2 between the horizontal molding surfaces (t1<t2), and the space between the inclined molding surfaces forms a narrow portion 115 of the small gap tl. The enhanced wettability portion 101 is disposed in the narrow portion 115. A relatively large gap portion116 (other locations) of gap t2 communicates with the resin injection port 113.

Figure 5:
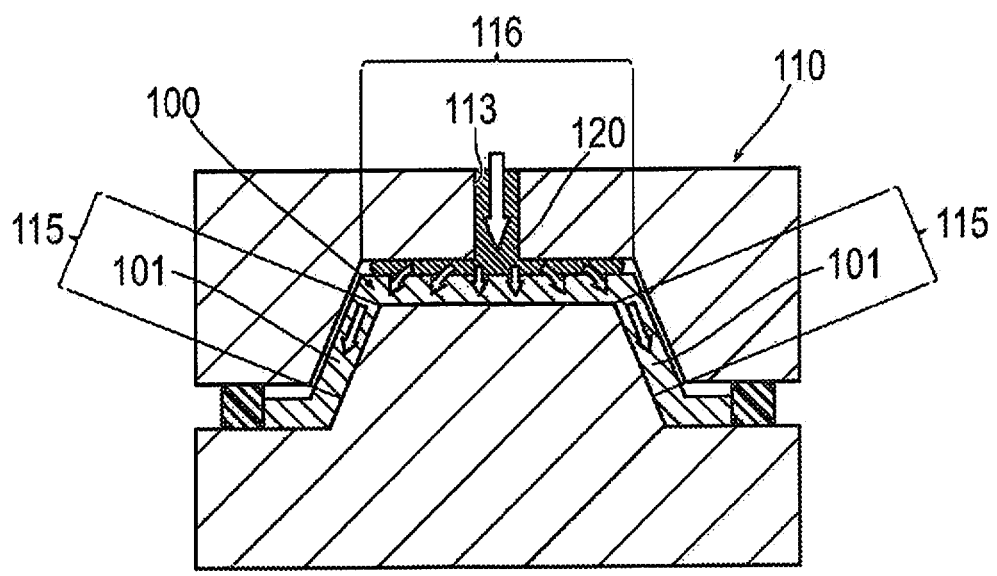
FIG. 5 is a view schematically illustrating the injection of resin into the metal mold.

As shown in FIG. 5, in Step S4, resin 120 is injected into the metal mold 110 through the injection port 113. The resin 120 flows from the relatively large gap portion 116 to the narrow portion 115 and is impregnated in the preform 100.

A thermosetting resin, for example, such as an epoxy resin or a phenol resin is used as the resin 120. The epoxy resin typically used is a two-component type, which is used by mixing the primary agent and the curing agent. Generally, a bisphenol A type epoxy resin is used as the primary agent and an amine type is used as the curing agent, but no limitation is imposed thereby. The resin 120 is not limited to thermosetting resins, and thermoplastic resins may also be used. In addition, the resin 120 may contain a mold releasing agent.

Figure 6:
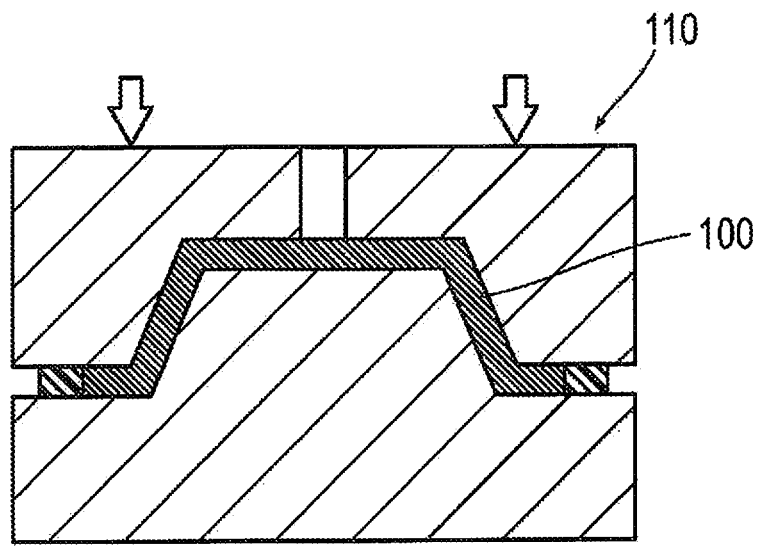
FIG. 6 is a view schematically illustrating a state in which the metal mold is further clamped after resin injection.

As shown in FIG. 6, in Step S5, the metal mold 110 is further clamped. At this time, the metal mold 110 is clamped until the cavity and the thickness of the composite material to be ultimately produced become essentially the same.

As the pressure inside the metal mold 110 increases with further clamping in Step S5, the resin 120 becomes more reliably distributed throughout the entire preform 100.

In Step S6, the resin 120 impregnated in the preform 100 is cured. If the resin 120 is a thermosetting resin, the resin 120 impregnated in the preform 100 can be cured by, for example, heating the metal mold 110 using a heating device such as a heater.

Figure 7:
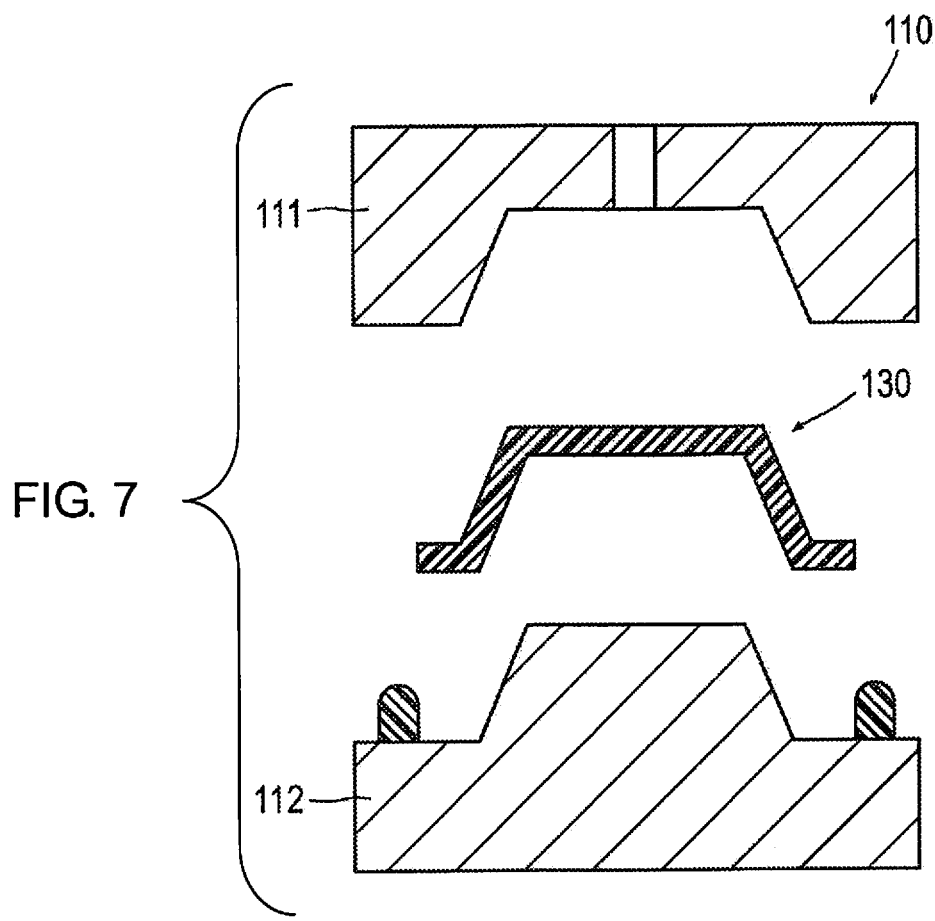
FIG. 7 is a view schematically illustrating the demolding of a molded article.

As shown in FIG. 7, in Step S7, the movable die 111 is moved so as to separate from the fixed die 112 to open the metal mold 110, and a composite material 130, which is the molded article, is demolded.

The composite material 130 has a relatively simple shape in the present embodiment, but no limitation is imposed thereby. For example, if the composite material 130 is manufactured as a frame component, such as a front side member or a pillar, or an outer panel component, such as a roof, which are used in automobile bodies, the composite material will have a correspondingly more complex shape.

The action and effects of the present embodiment will now be described.

The narrow portion 115, being narrower than the relatively large gap portion 116, has high flow resistance, which impedes the flow of the resin 120.

However, in the present embodiment, the enhanced wettability portion 101 (portion of the fiber base material where the wettability has been enhanced) is disposed in the narrow portion 115, and the capillary action is thereby enhanced in the narrow portion 115, so that the resin 120 is readily drawn into the narrow portion 115. Thus, the resin 120 is easily and entirely distributed, and impregnation variations can be suppressed.

Figure 8:
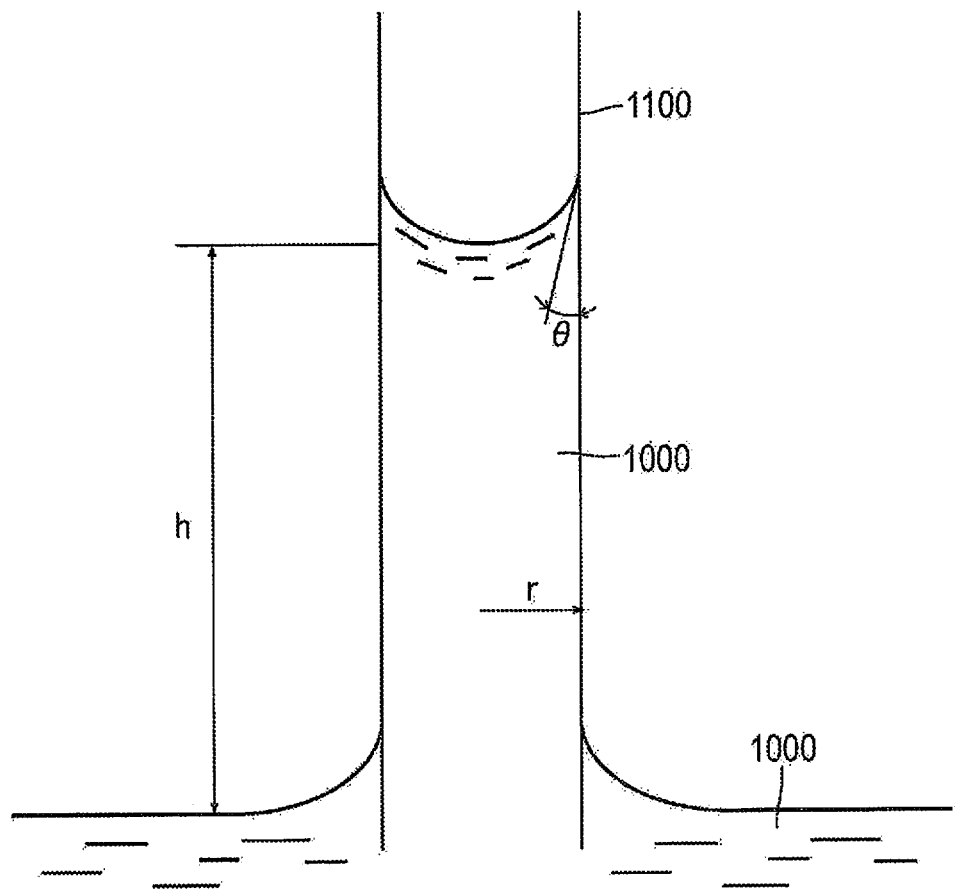
FIG. 8 is a view for explaining capillary action.

With reference to FIG. 8, in general, the height h, up to which a liquid 1000 is drawn into a capillary tube 1100 by means of capillary action, can be expressed by Equation 1 below; when the wettability is enhanced and the contact angle θ (90°>θ>0) of Equation 1 becomes small, cos θ on the right side of the equation increases, so that the height h up to which the liquid 1000 is drawn increases. That is, with enhanced wettability, the liquid 1000 is more readily drawn into the capillary tube 1100. Based on the same principle, the resin 120 is more readily drawn by arranging the enhanced wettability portion 101 in the narrow portion 115.

Equation 1

$$h = \frac{2\sigma \cos\theta}{\gamma r} \quad \text{Equation 1}$$

In Equation 1, θ: contact angle, σ: surface tension, τ: capillary tube radius, γ: specific gravity of the liquid.

In contrast to the relatively large gap portion 116, the narrow portion 115 is positioned on the downstream side of the flow direction of the resin 120; but since the flow of the resin 120 is reduced on the downstream side due to energy loss on the upstream side due to flow resistance, etc., so that it is particularly difficult for the resin 120 to flow.

However, in the present embodiment, since the enhanced wettability portion 101 is disposed in the narrow portion 115 on the downstream side and the drawing of the resin 120 is increased due to capillary action, the resin 120 is more readily distributed, even on the downstream side, and variations in impregnation can be suppressed particularly effectively.

As long as the wettability can be enhanced in a portion of the preform 100 (fiber base material), the invention is not limited to the partial irradiation with a plasma or ultraviolet light, as in the present embodiment; for example, a sizing agent may be applied locally.

However, when an attempt is made to locally increase wettability with a sizing agent, for example, the preform 100 requires masking, which is time- and labor-intensive.

In contrast, partial irradiation is sufficient if a plasma or ultraviolet light is used, so that it is possible easily to increase the wettability over a prescribed range.

In the present embodiment, the wettability is enhanced after the preform 100 is formed, so that, compared to the case in which the wettability of the fiber base material 102 is enhanced prior to preforming, the period from enhancing the wettability to injection of the resin 120 (Step S4) can be made short.

Therefore, it is possible to inject the resin 120 while the wettability is maintained, and the effect of the enhanced wettability portion 101 is not easily impaired.

Figure 9:
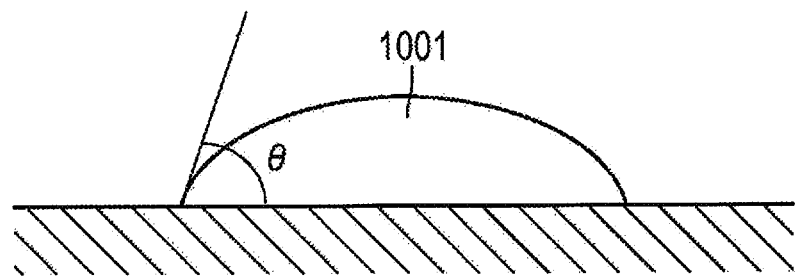
FIG. 9 is a view for explaining the relationship between the contact angle of a droplet and wettability.
Figure 10:
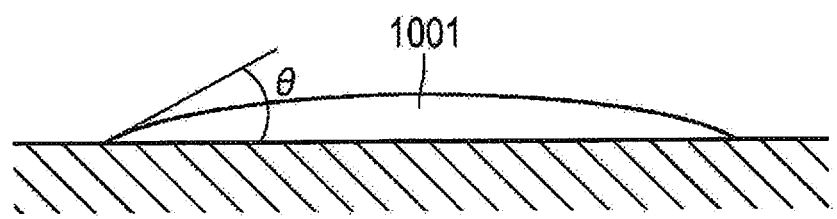
FIG. 10 is a view for explaining the relationship between the contact angle of a droplet and wettability.

As shown in FIGS. 9 and 10, the degree of wettability can be determined from the size of the contact angle θ of a droplet 1001 that is dropped onto the base material, wherein, the greater the contact angle θ, the lower the wettability, and the smaller the contact angle θ, the higher the wettability.

Second Embodiment

Figure 11:
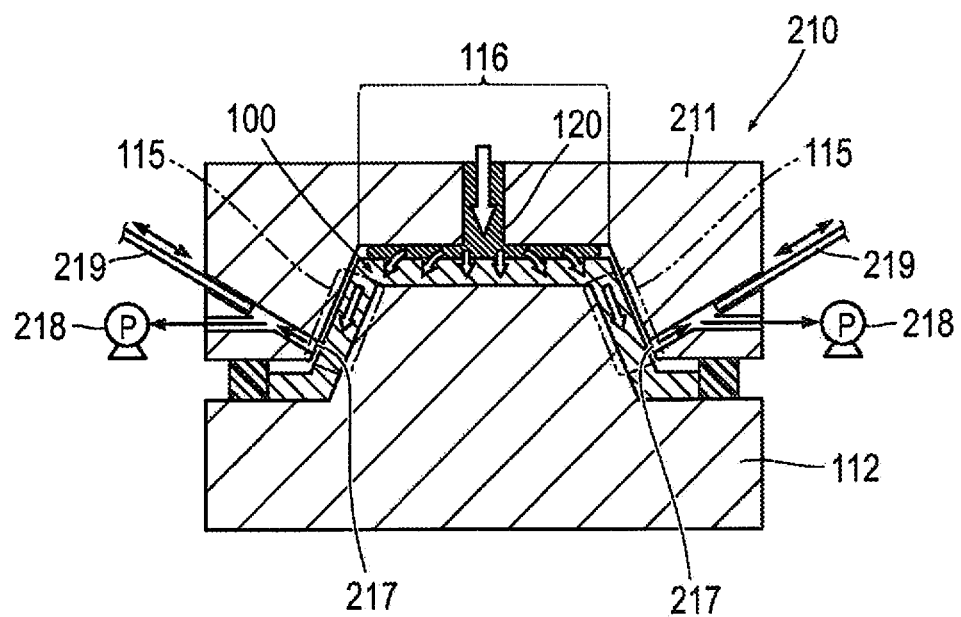
FIG. 11 is a view schematically illustrating the injection of resin accompanied by vacuum evacuation.

As shown in FIG. 11, a metal mold 210 that is different from that of the first embodiment is used in the second embodiment. In addition, the present embodiment is different from the first embodiment in that the narrow portion 115 is vacuum-pumped in Step S4 for injecting the resin 120. Since the other device configurations and steps of the present embodiment are essentially the same as in the first embodiment, the redundant explanations are omitted.

The metal mold 210 has a movable die 211 that is different from the first embodiment. A vacuum port 217 that communicates with the narrow portion 115 is formed on the molding surface of the movable die 211. The invention is not limited to such a form, and it is sufficient if the vacuum port 217 is formed on the molding surface of at least one of the movable die 211 and the fixed die 112.

The vacuum port 217 communicates with a vacuum pump 218. In addition, a pin-shaped opening/closing member 219 is provided so as to be capable of freely moving close to or away from the vacuum port 217. The vacuum pump 218 evacuates the narrow portion 115 through the vacuum port 217. At this time, the opening/closing member 219 is separated from the vacuum port 217, and the vacuum port 217 is opened.

In the resin injection Step S4 of the present embodiment, the resin 120 is injected in a state in which the narrow portion 115 is vacuum-pumped and set to a more negative pressure than the other location 116.

Before the resin 120 flows and reaches the vacuum port 217, the opening/closing member 219 is pushed in to approach the vacuum port 217 and closes the vacuum port 217. Therefore, the resin 120 does not flow into the vacuum port 217.

In the present embodiment, since the resin 120 is injected while the narrow portion 115 is set to a more negative pressure than the other location 116, the resin 120 is drawn into the narrow portion 115 and is more easily distributed throughout, variations in impregnation can be more reliably prevented.

In addition, since the resin 120 is prevented from flowing into the vacuum port 217 by the opening/closing member 219, demolding is a simple matter and unnecessary deburring can be avoided.

The present invention is not limited to the embodiment described above, and various modifications are possible within the scope of the claims.

For example, the present invention is not limited to the molding method referred to as CRTM (Compression Resin Transfer Molding) molding method, as is illustrated in FIG. 1 of the present embodiment above, and may include the RTM (Resin Transfer Molding) molding method, in which full clamping is carried out in Step S3 of FIG. 1.

In this case, in Step S3, clamping is carried out until the cavity dimension of the metal mold 110 is essentially equal to the thickness of the composite material 130, and the resin curing Step S6 is carried out without carrying out the further clamping Step S5 after the resin injection Step S4.

The invention claimed is:

1. A molding method for molding a composite material comprising:
   enhancing wettability of only a portion of a fiber base material;
   disposing the portion of the fiber base material in a narrow portion of a cavity in a metal mold in which a gap constituting the cavity in the narrow portion is smaller than other locations of the cavity in the metal mold, the enhanced wettability portion of the fiber base material corresponding to the narrow portion of the cavity in the metal mold;
   injecting resin into the metal mold in which the fiber base material is disposed; and
   curing the resin to form the composite material.

2. The molding method according to claim 1, wherein the portion of the fiber base material that is disposed in the narrow portion is positioned further on a downstream side in a flow direction of the resin than the other locations.

3. The molding method according to claim 1, wherein the wettability is enhanced in the portion of the fiber base material by irradiating a plasma or ultraviolet light.

4. The molding method according to claim 1, further comprising
   applying a lower pressure in the narrow portion than in the other locations for injection of the resin.

5. The molding method according to claim 2, wherein the wettability is enhanced in the portion of the fiber base material by irradiating a plasma or ultraviolet light.

6. The molding method according to claim 2, further comprising
   applying a lower pressure in the narrow portion than in the other locations for injection of the resin.

7. The molding method according to claim 3, further comprising
   applying a lower pressure in the narrow portion than in the other locations for injection of the resin.

8. The molding method according to claim 5, further comprising
   applying a lower pressure in the narrow portion than in the other locations for injection of the resin.

* * * * *